United States Patent [19]
Suwitoadji

[11] Patent Number: 5,118,374
[45] Date of Patent: Jun. 2, 1992

[54] METHOD AND APPARATUS FOR WRAPPING A LAMINATE

[75] Inventor: Freddy H. Suwitoadji, Phoenix, Ariz.

[73] Assignee: Evans Rotork, Inc., Glendale, Ariz.

[21] Appl. No.: 588,170

[22] Filed: Sep. 26, 1990

[51] Int. Cl.⁵ ............................................. B32B 3/04
[52] U.S. Cl. ................................. 156/216; 156/212;
156/216; 156/475; 156/477.1; 156/479;
156/481; 156/499
[58] Field of Search ............ 156/212, 216, 475, 477.1,
156/479, 481, 499

[56] References Cited
U.S. PATENT DOCUMENTS

| | | | |
|---|---|---|---|
| 2,937,689 | 5/1960 | Peterson | 156/216 |
| 3,392,074 | 7/1968 | Bartron | 156/216 |
| 3,616,076 | 10/1971 | Gepkens | 156/479 |
| 3,888,613 | 6/1975 | Fries et al. | 156/216 |
| 4,035,224 | 7/1977 | Anderson | 156/216 |
| 4,406,729 | 9/1983 | Elias | 156/475 |

Primary Examiner—W. Gary Jones
Assistant Examiner—David Reifsnyder
Attorney, Agent, or Firm—Cahill, Sutton & Thomas

[57] ABSTRACT

The outer surface of the base of a heated C channel is brought to bear against the surface of a laminate to be bent about and adhered to the curved edge of a substrate by pivoting a frame pivotally attached to a substrate supporting platform. A torque tube supports the C channel to inhibit bending and twisting of the C channel. A plurality of pairs of pneumatic cylinders extend from the frame to urge the torque tube and attached C channel toward the curved edge and to maintain the base of the C channel in progressive tangential contact with the point of attachment of the laminate to the curved edge while minimizing sliding movement between the base of the C channel and the laminate.

28 Claims, 5 Drawing Sheets

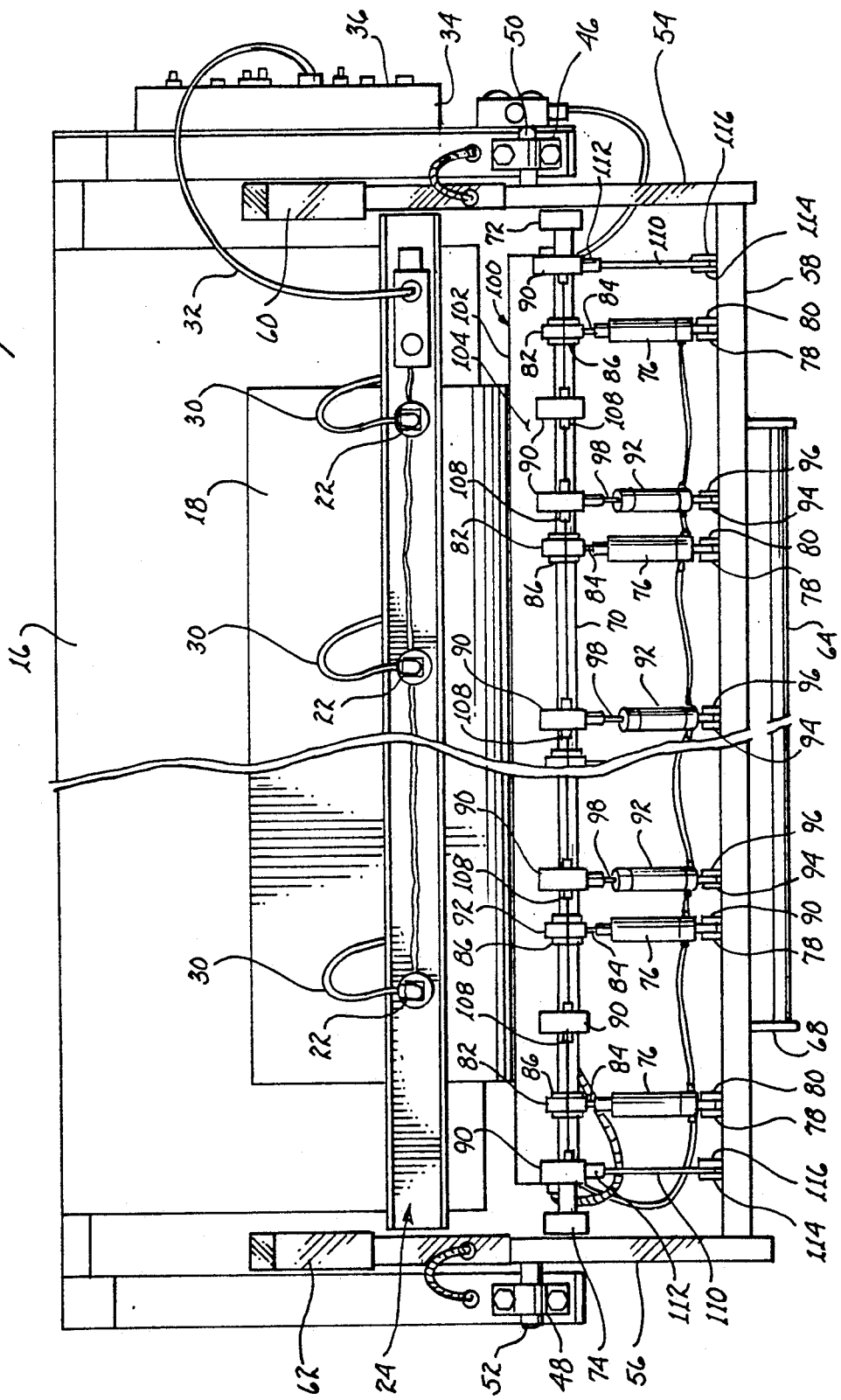

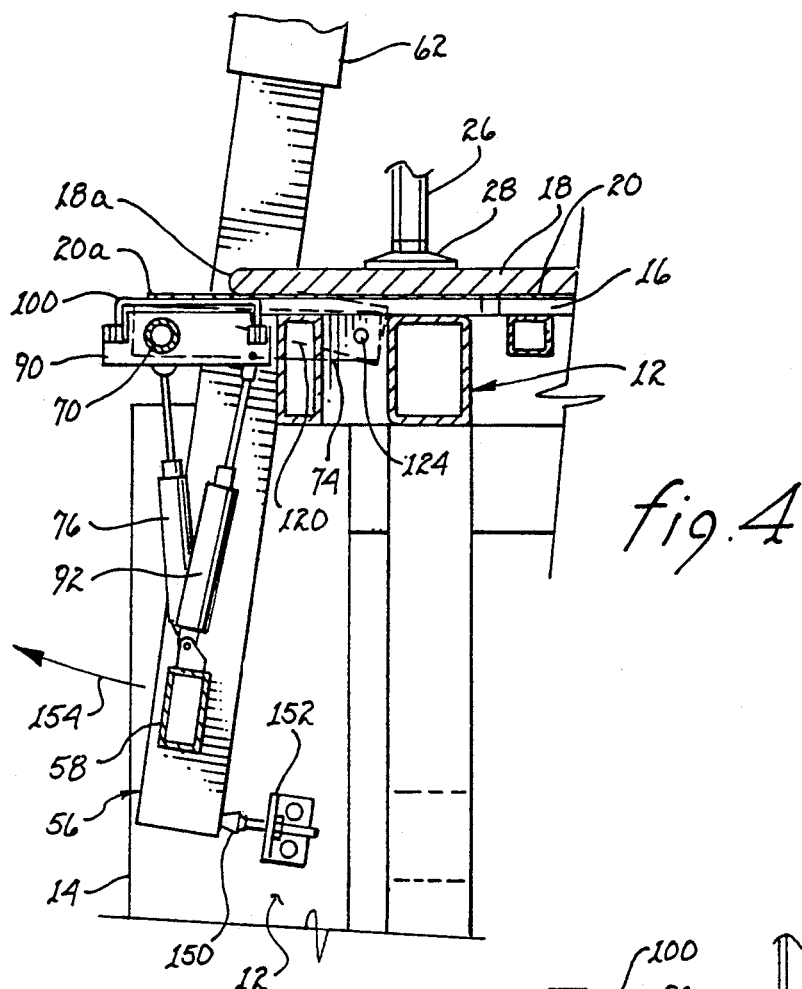
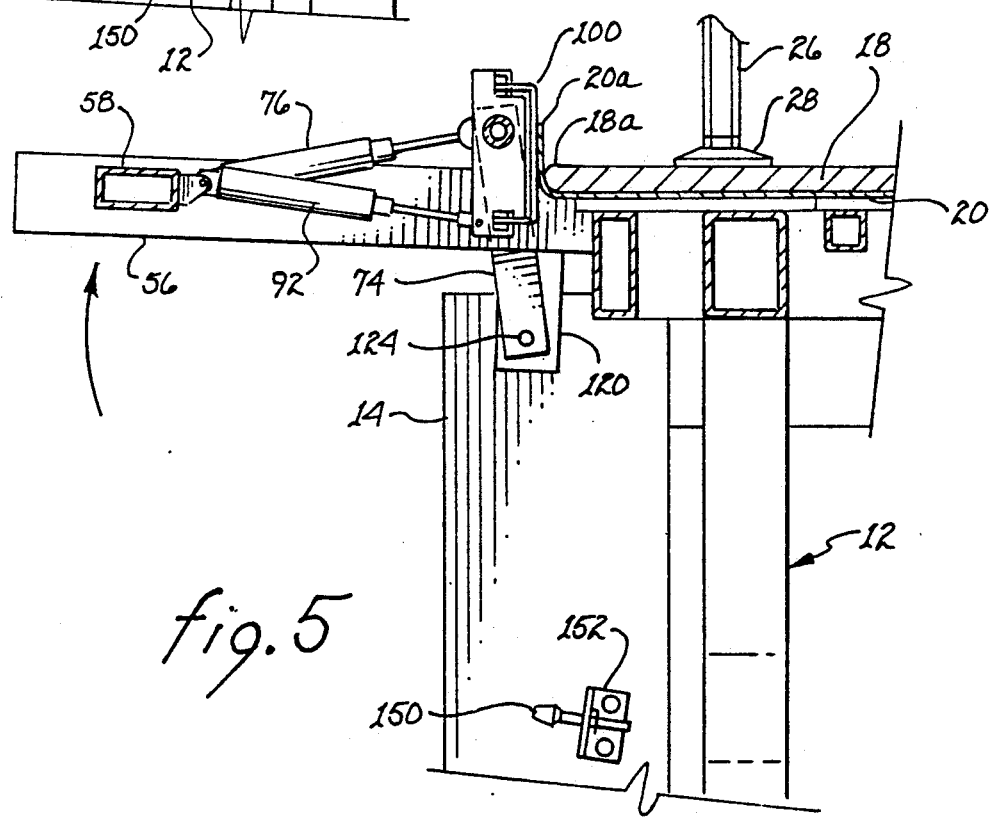

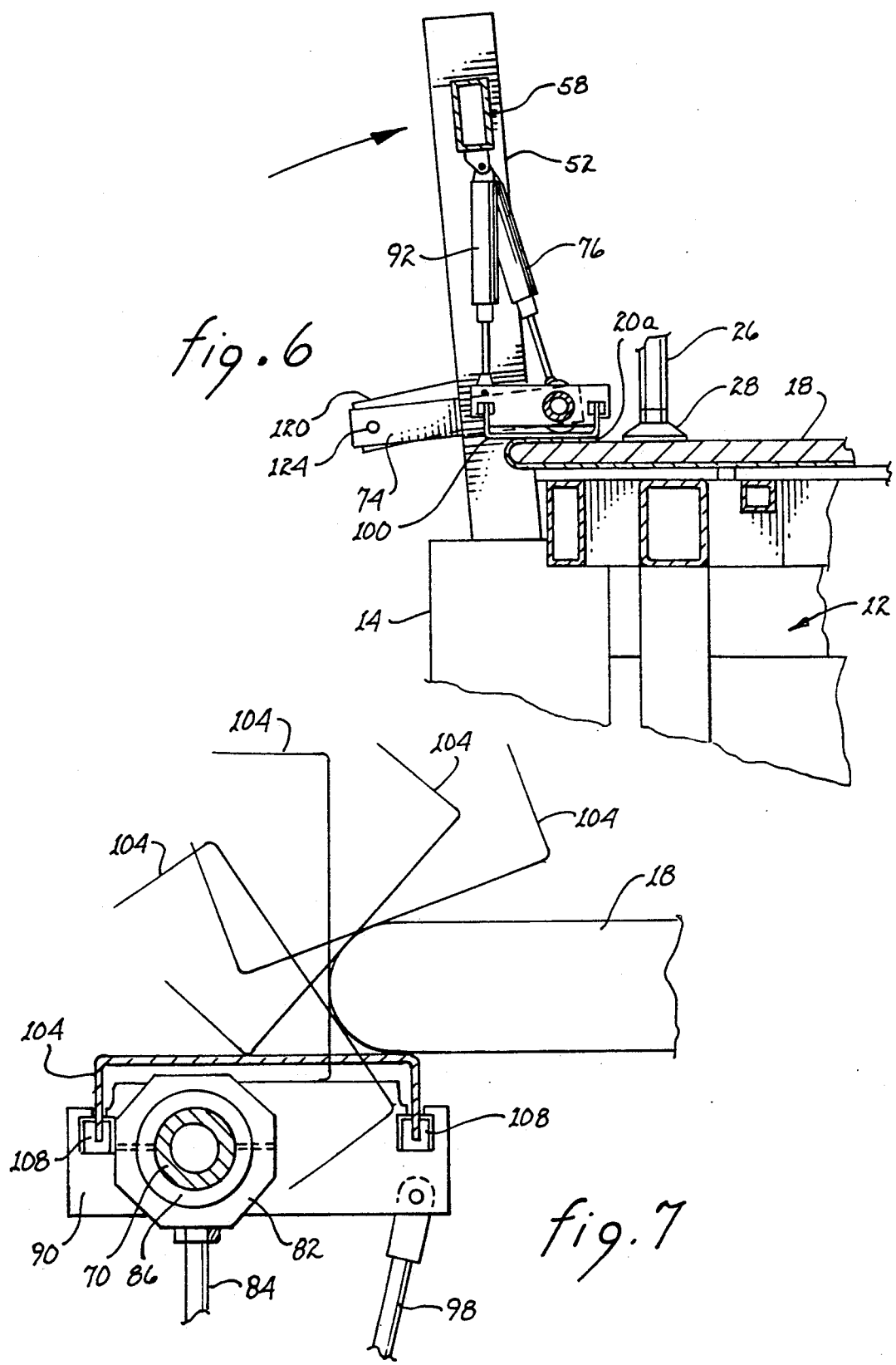

METHOD AND APPARATUS FOR WRAPPING A LAMINATE

BACKGROUND OF THE INVENTION

1. Field of the Invention

The present invention relates to manually operated laminating apparatus for wrapping a laminate about a curved edge of a substrate.

2. Description of Related Art

In state of the art countertop laminate attaching apparatus, a substrate is placed upon a table and a sheet of laminate is adhesively attached thereto. The usual 90° rounded top front edge of the substrate extends laterally from the table along with a segment of the laminate to be adhered thereto. A source of heat, nominally radiant heat, is applied to the segment of laminate to heat it and render it pliable. An edge member, which may be pivotally attached to the table, is rotated downwardly to come into contact with the now pliable laminate and bend and guide it about the 90° rounded top front edge of the substrate. The guiding action produces essentially continuing progressive contact between the laminate and the substrate to effect a good bond with the interposed adhesive.

For substrate edges which are rounded to 180°, the edge member may be rotated for an additional 90°. However, due to the mechanical complexity attendant the commensurate travel and rotation of such edge member, difficulties often exist in applying sufficient pressure against the terminal edge of the laminate to ensure an adequate bond at the end of the 180° curve. The edge members will also have a tendency to slide along the laminate due to the mechanical complexity; such sliding movement may mar or otherwise deface the laminate.

Conventional sources of heat for heating the heat activated adhesive, such as radiant lamps, present a problem of heat application to ensure uniform heating along the full curvature of the bend. To solve the latter problem, the edge member may be heated to transmit heat to the underlying substrate and interposed adhesive.

SUMMARY OF THE INVENTION

While apparatus for laminating a laminate to a 180° curved edge of a substrate exists, a combination of problems of heat application, marring of the laminate, application of uniform pressure throughout the curve and application of uniformly distributed pressure longitudinally along the curved edge exist.

It is therefore a primary object of the present invention to provide apparatus for bending and attaching a laminate to a 90° to 180° curved edge of a substrate.

Another object of the present invention is to provide apparatus for simultaneously heating and bending with uniformly applied pressure a laminate to be adhered to a curved edge of a substrate.

Still another object of the present invention is to provide apparatus for wrapping an 8 foot width laminate about the curved edge of a substrate.

A yet further object of the present invention is to provide multiple pairs of pneumatic cylinders for pivotally positioning a forming member during rotational movement of the forming member about the curved edge of a substrate.

A further object of the present invention is to provide apparatus for preventing bending and twisting of a forming member during lamination of a laminate about a curved edge.

A yet further object of the present invention is to provide a manually operated or automated forming member for applying a laminate to a curved edge of a substrate.

A still further object of the present invention is to provide a method for urging bending and adhesion of a laminate to a 90° to 180° curved edge of a substrate.

A still further object of the present invention is to provide a method for progressively rotating a forming member about a curved edge.

These and other objects of the present invention will become apparent to those skilled in the art as the description thereof proceeds.

BRIEF DESCRIPTION OF THE DRAWINGS

The present invention will be described with greater specificity and clarity with reference to the following drawings, in which:

FIG. 3 is a top view taken along lines 3—3, as shown in FIG. 2a;

FIGS. 4, 5 and 6 illustrate progression of the apparatus for wrapping a laminate about the curved edge of a substrate;

FIG. 7 illustrates a plurality of positions of the forming apparatus, which illustrations are superimposed upon one another.

DESCRIPTION OF THE PREFERRED EMBODIMENT

Widely used countertops have a particle board or wood frame substrate with a top surface covered by a sheet of plastic laminate which is adhered thereto. The front edge of such substrates may be rounded 180°. For substantial production runs, automated equipment may be employed to attach the laminate to the curved edge. Such equipment contemplates the use of radiant heat sources for heating the laminate to enhance forming the laminate about the curved edge and for activating heat activated adhesive, when used, to secure the laminate about the curved edge. Rollers are one type of mechanism that may be employed to force the heated laminate around the curved edge. Such equipment is generally relatively expensive and is practical and cost effective only in a mass production large volume environment. For smaller scale production environments and for individual cabinet making enterprises, manually operated one countertop at a time equipment is both practical and necessary. Depending upon the degree of complexity of the equipment, it may be automated, partially automated or manually operated.

Figure 1:
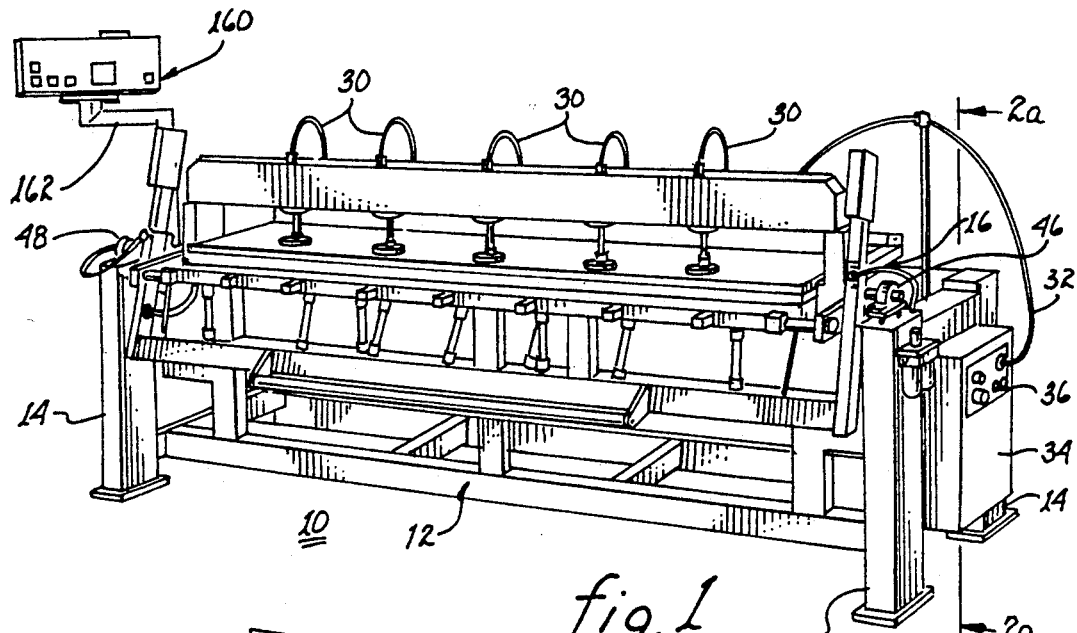
FIG. 1 is a perspective view of apparatus for attaching a laminate to a curved edge of a substrate.
Figure 2A:
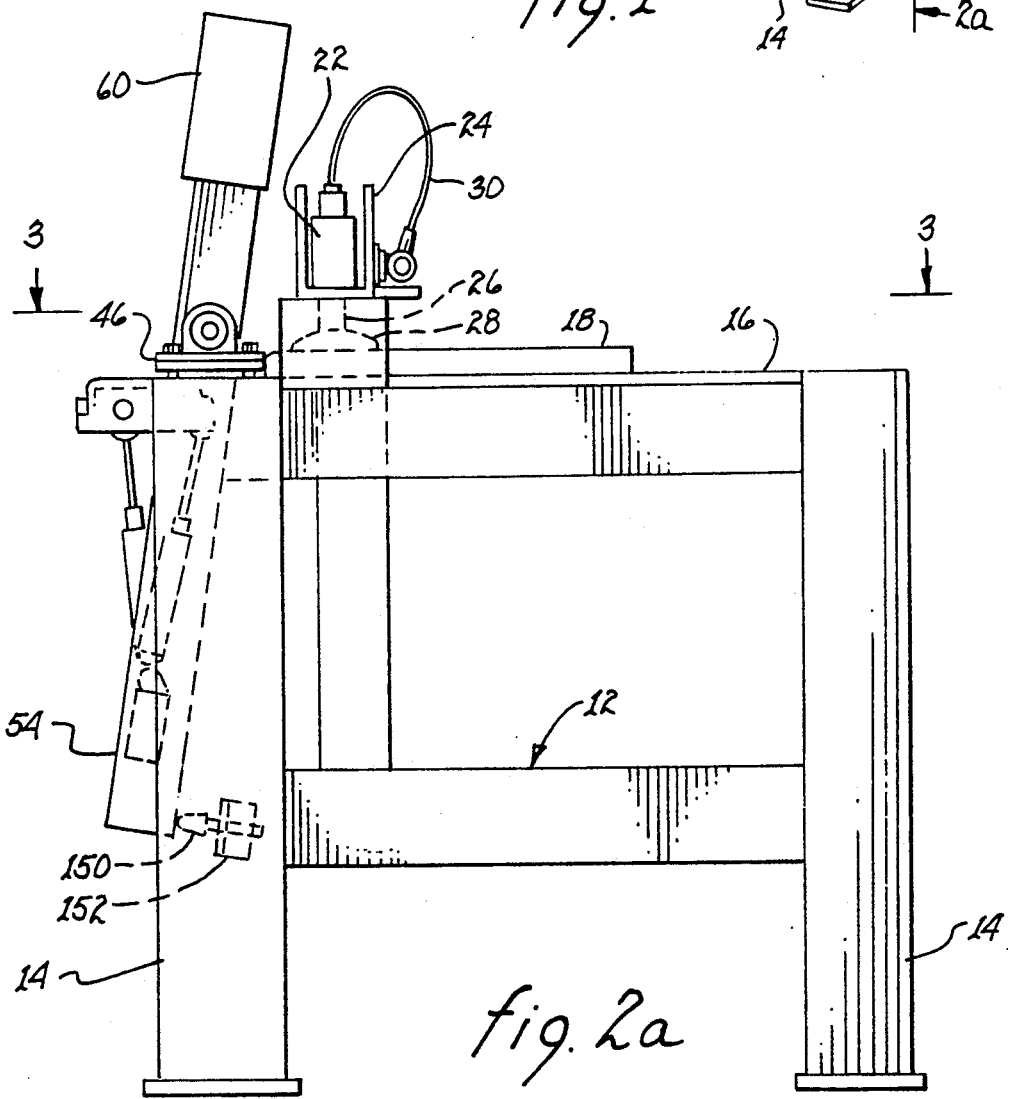
FIG. 2a is an end view taken along lines 2a-2a, as shown in FIG. 1.

Referring to FIG. 1, there is illustrated a forming machine 10 for bending and adhering a laminate to a 90° to 180° curved edge of a substrate, which substrate may be a standard full 8 foot length. The forming machine includes a framework 12 of very robust construction supported upon legs 14 disposed at each of the four corners. Typically, the framework and legs are of rectangular hollow steel tubing. As shown more clearly in combination with FIGS. 2 and 3, forming machine 10 includes a table 16 for supporting a substrate 18. Typically, the substrate has a laminate attached to one side, which laminate is to be wrapped around and attached to a curved edge of the substrate. A plurality of hydraulic or pneumatic cylinders 22 are supported upon a cross member 24, which cross member forms a part of framework 12. As illustrated, the cross member may be a C channel to provide resistance against bending in the vertical axis. Each of cylinders 22 includes a plunger 26 supporting a foot 28, which foot bears against substrate 18. Each of cylinders 22 is hydraulically or pneumatically operated through a plurality of conduits 30 and conduit 32; the latter is connected to a source of pressure 34. Control and regulation of the pressure applied may be effected through a control panel 36. Upon actuation of cylinders 22, plungers 26 can be extended to apply a downward holding force upon substrate 18 via feet 28 to retain the substrate firmly and immovably positioned on table 16.

Pillow blocks 46,48 are attached to framework 12, such as the upper extremities of front legs 14. These pillow blocks support pivot pins 50,52, which pivot pins extend from arms 54,56. A bar 58 interconnects one extremity of each of the arms. Counterweights 60,62 are disposed at the other extremity of each of the arms. An elongated handle 64 may be attached to bar 58 via brackets 66,68. A torsion bar 70 is rotatably mounted at the extremity of each of pivotally attached arms 72,74; these arms will be described in further detail below. The torsion bar is specially constructed to resist twisting or bending and it will be very stiff and resist deflection in any axis. A plurality of pneumatic or air cylinders 76 are pivotally attached to bar 58 through pairs of ears 78,80. Additionally, a collar 82 extending from plunger 84 of each air cylinder is secured about torsion bar 70 through a bearing 86. Thereby, torsion bar 70 is free to rotate within bearings 86 attached to the collars 82. A plurality of heater fingers 90 penetrably receive torsion bar 70 and are clamped thereto to preclude independent rotation between a heater finger and the torsion bar. A plurality of further air cylinders 92 are pivotally secured to bar 58 through pairs of ears 94,96. Plunger 98 of each air cylinder 92 is attached to the respective heater finger at the end of the heater finger furthest removed from torsion bar 70. Coil springs 110 may be incorporated to draw heater 100 and torsion bar 70 toward bar 58 when the pressure in air cylinder 76,92 is relieved or reduced. These coil springs are attached to the outermost heater fingers, as illustrated, through attachment means 112. The coil springs are attached to bar 58 through flanges or ears 114,116. Heater 100 is C shaped in cross section and includes a base section 102 which contacts the laminate to be attached to the substrate. The edges of sides 104,106 of heater 100 are supported within thermal insulators 108 disposed in corresponding slots in heater fingers 90.

Figure 2B:
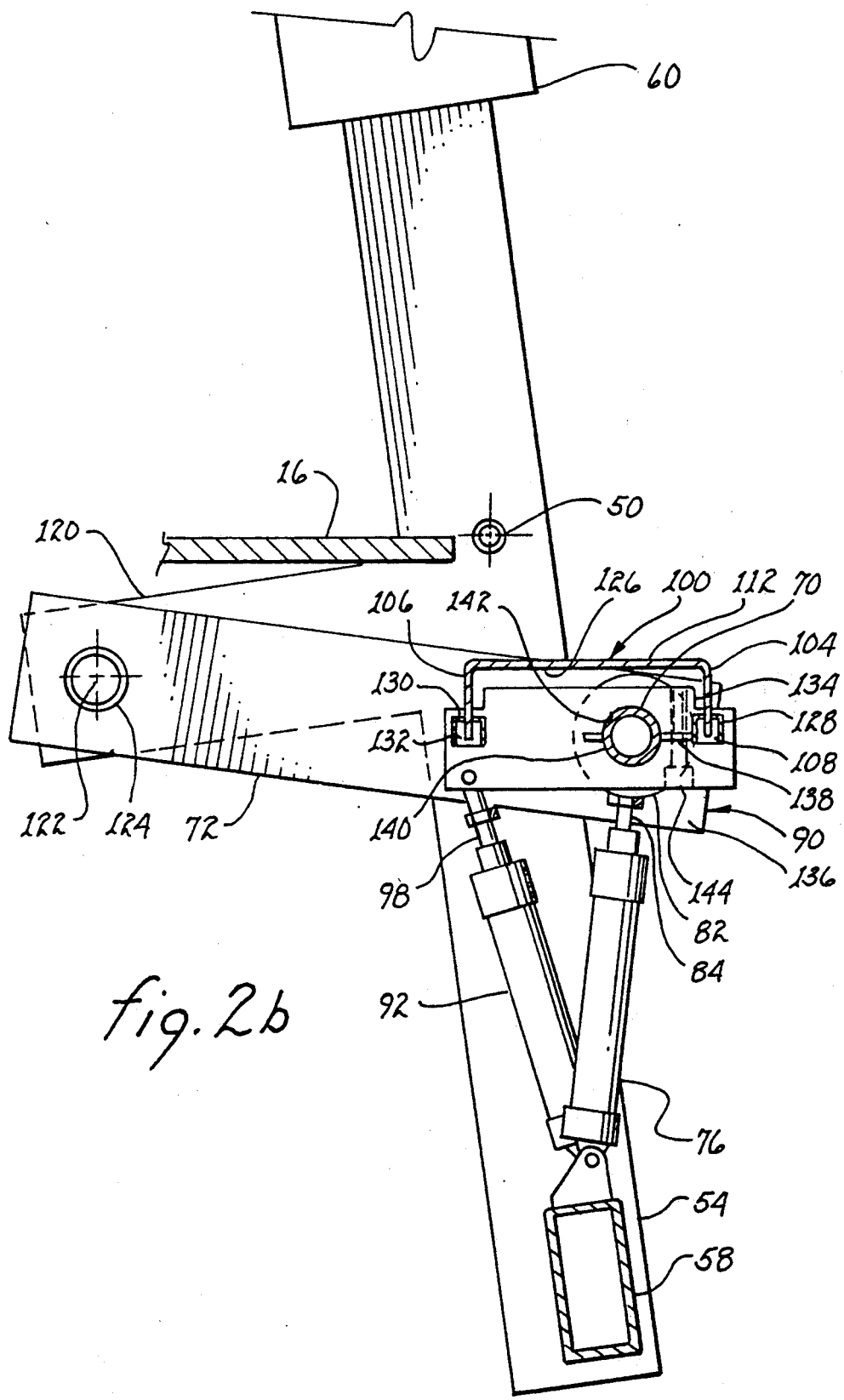
FIG. 2b is a side view of the pivotally attached elements for bending a laminate section.

Referring to FIG. 2b, further details attendant arm 54 (it being understood that arm 56 is a mirror image) will be described. A bar 120 extends from arm 54 to provide a pivot about axis 122. Arm 72 (see FIG. 3) is pivotally attached to bar 120 through pivot means 124 centered on pivot axis 122.

Although not illustrated, torsion bar 70 is pivotally secured to the extremity of arm 72; the torsion bar is similarly secured to arm 74 at the opposite end. Heater 100 includes a surface mounted heating element 116 disposed adjacent at least base 112; the heater may extend along the interior surfaces of sides 104,106. Slots 128 are disposed in the heater finger to receive thermal insulator 108 supporting the edge of side 104. A similar slot 130 supports an insulator 132 for receiving the edge of side 106. Torsion bar 70 is clamped in heater finger 90 between heater finger segments 134,136 separated from one another by a slot 138, which slot may extend diametrically through aperture halves 140,142 for receiving the torsion bar. A bolt 144, extending through a passageway in segment 136 threadedly engages segment 134. Upon tightening of the bolt, the segments will be drawn toward one another and aperture halves 140,142 will be tightened about the torsion bar to rigidly grip it. Upon inspection, it will become evident that extension of plunger 98 of air cylinder 92 will produce rotation of heater finger 90 with commensurate rotation of torsion bar 70. Extension of plunger 84 of air cylinder 76 will result in rotation of the heater finger about the pivot axis at the point of attachment between plunger 98 and the heater finger with commensurate rotation of the torsion bar. Additionally, arm 72 will rotate about pivot axis 112. Rotation of arm 54 about pivot pin 50 will not produce any commensurate or relative rotation of arm 72 with respect to arm 54 or of heater finger 90 with respect to either arm 72 or arm 54.

Referring jointly to FIGS. 4, 5, 6 and 7, a description of the operation of finger 90 and its supporting apparatus to effect lamination of a laminate about a curved edge of a workpiece will be described. In the initial position of arm 54 (and arm 56), it rests against a bumper 150, which bumper is attached by a bracket 152 to a part of framework 12. Substrate 18, including laminate 20 attached to the bottom surface of the substrate, is retained against table 16 by the downward force imposed by feet 28 in response to pressure exerted by plunger 26. End 20a of laminate 20 extends beyond curved edge 18a of substrate 18 in general planar alignment with the remaining part of the laminate. Heater 100 supports laminate segment 20a upon activation or extension of air cylinders 76,92. Upon subsequent energization of heater pad 126 interior of heater 100, the heater will transmit heat to laminate section 20a and facilitate bending of the laminate section. Additionally, the application of heat will activate an adhesive placed upon the laminate section in the event a heat responsive adhesive is used. After an initial heating of the laminate section to permit forming the laminate about curved edge 18a, opposed pair of arms 54,56 are rotated by manually grasping handle 64 and drawing the handle upwardly to bring about rotation as depicted by arrow 154. Simultaneously, air cylinders 76,92 are actuated to force heater 100 to bear against curved edge 18a and cause laminate section 20a to wrap around the curved edge. The stiffness of torsion bar 70 precludes twisting or bending of heater 100 which might result from non uniform application of forces by air cylinders 76 and air cylinders 92. Moreover, any imperfections in the laminate which might cause uneven bending will not be accommodated. By employing sufficiently close spacing between heater fingers 90, bending of heater 100 between the heater fingers will be essentially eliminated. Upon further upward movement of arms 54, as depicted in FIG. 5, progressive translation of heater 100 along curved edge 18a will occur to essentially eliminate sliding movement of the heater against laminate section 20a. In the full upright position of arm 54, as depicted in FIG. 6, heater 100 rests upon laminate segment 20a, which laminate segment is adjacent and in contact with the upper surface of substrate 18. Upon release of the pressure within air cylinders 76,92, springs 110 will draw heater fingers 112 toward bar 58 with resulting corresponding translation of torsion bar 70 and further heater fingers 90 attached thereto toward bar 58. The resulting displacement of heater 100 from laminate section 20 permits downward rotation of pair of arms 54,56 to the start position depicted in FIG. 4.

Because of the stiffness of torsion bar 70, laminations at least 8 feet wide may be bent around a 180° curved edge of a substrate. For such wide laminations, the air pressure present within air cylinders 76,92 may be increased to ensure sufficient pressure upon laminate segment 20a to bring about firm contact with the underlying curved edge of the laminate and a good adhesive junction therebetween. During the forming process, heater 100 will continuously heat laminate section 20a to permit it to bend about the curved edge and provide only limited resilient restraint against bending. Depending upon the type of laminate used, the heat applied may be sufficient to permanently mold the laminate into the U shaped cross section resulting from wrapping of the laminate about the edge of the substrate.

By incorporating two spaced apart air cylinders (76,92) acting on heater 100, opposed rotation inducing forces are present, which, in combination with the fulcrum provided to the heater at the point (line) of contact with the curved edge (laminate section), will continuously rotate the heater in order to maintain the two cylinders in equilibrium. This rotational movement will cause the heater to roll around the curved edge. The heater also must be translated along an axis generally parallel with the longitudinal axis of arms 54,56 to permit the heater to roll around the curved edge. Such translation can be effected by various mechanisms, such as a pin and groove (linear or curvelinear). It is well accepted that a linear translation mechanism presents a higher friction load on the motive force than a pivoting mechanism. To minimize friction loads (forces), a bar 120 is used to provide a location for pivot axis 122. Arm 74 interconnects heater 100 with pivot means 124 disposed at the pivot axis to provide the capability for the heater to translate along a path generally aligned with arms 54,56 (which path is necessarily curvelinear due to the pivotal movement of arm 74). The distance between the heater and the pivot axis serves as a lever arm to further reduce the forces necessary to overcome friction of the pivot means and to cause arm 74 to pivot and urge translational movement of heater 100. The resulting loads which must be overcome by air cylinders 74,92 are minimized. This reduction in air cylinder size provides benefits attendant minimizing the mass of the air cylinders, reducing the weight of counterweights 60,62 and lowering the pressure necessary for the air cylinders to operate . The supporting structure and various fittings also can be reduced size and weight. By experimentation and from technical analysis, it has been determined that at a location of about 135° from the starting point (0°) a sliding motion of the heater with respect to the curved edge (laminate) will occur for a short distance due to the geometry of the interacting components. However, any marring of the laminate due to this sliding movement is generally unimportant as it will be on the underside of the counter top, table, etc. formed by the substrate and it will not be visible.

A control panel 160 is mounted upon a post 162 extending from framework 12. The control panel may include switches or other controls for regulating the amount of pressure exerted by each of air cylinders 76,92. In addition, controls for regulating the amount of current transmitted to the heating pad within heater 100 may be incorporated. The status of various limit switches and other safety related devices may also be incorporated.

Because the movement of bar 58 resulting in pivotal movement of pair of arms 54 is generally straight forward, automated, or semi automated apparatus may be incorporated. That is, motive means connected through a suitable gear train or other drive mechanism may be interconnected with arms 54,56 to cause pivotal movement in response to power applied by the motive means. Actuation of such motive means may be by a simple on/off switch or the like. However, because of the use of counter weights 60,62 and the geometry of the laminate bending apparatus, relatively low forces are required to raise bar 58. For this reason, manual operation of forming machine 10 would appear to be economical, prudent and preferable. Furthermore, for non constant curvature edges, manipulation of the forces exerted between set of cylinders 76 and set of cylinders 92 may be effected to result in more rapid rotational movement of heater 100 than that brought about pivotal movement of arms 54,56 in order to accommodate an increased rate of curvature of the substrate edge or it may be slowed down to accommodated a reduced rate of curvature. Such manipulations are readily performable by skilled operators who are capable of laminating custom curvature substrate edges.

While the principles of the invention have now been made clear in an illustrative embodiment, there will be immediately obvious to those skilled in the art many modifications of structure, arrangement, proportions, elements, materials and components used in the practice of the invention which are particularly adapted for specific environments and operating requirements without departing from those principles.

I claim:

1. Apparatus for forming and adhering a laminate about a curved edge of a substrate, said apparatus including in combination:
   a) a framework for supporting and retaining in place the substrate, which substrate includes a laminate extending from one surface past the curved edge of the substrate;
   b) a heater for contacting the extending laminate, said heater being translatable about the curved edge to bend and form the extending laminate about the curved edge;
   c) a torsion bar for supporting said heater to prevent bending and twisting of said heater during forming of the laminate extension;
   d) arm means for translating said heater about the curved edge;
   e) first pivot means having a first pivot axis for pivoting said arm means relative to said framework;
   f) second pivot means having a second pivot axis for pivoting said heater relative to said torsion bar, said second pivot axis being displaced from said first pivot axis; and
   g) third pivot means having a third pivot axis for pivoting said torsion bar through an arc relative to said arm means.

2. The apparatus as set forth in claim 1 including means for continuously urging said heater toward the curved edge during translation of said heater.

3. The apparatus as set forth in claim 1 including means for establishing rotational equilibrium of said heater with respect to the point of contact between said heater and the extending laminate adjacent the curved edge.

4. The apparatus as set forth in claim 1 including means for manually actuating said arm means.

5. The apparatus as set forth in claim 4 including counter balance means for reducing the force required to actuate said arm means.

6. The apparatus as set forth in claim 1 including means for heating the extending laminate commensurate with the bending of the laminate about the curved edge.

7. The apparatus as set forth in claim 6 wherein said heater includes an exterior surface for contacting the extending laminate and an interior surface and wherein said heating means includes a heating pad disposed upon said interior surface.

8. The apparatus as set forth in claim 1 wherein said arm means includes a bar extending therefrom for defining said third pivot axis and including second arm means pivotally attached to said bar at said third pivot axis for supporting said heater and said torsion bar.

9. The apparatus as set forth in claim 8 including means for continuously urging said heater toward the curved edge during translation of said heater.

10. The apparatus as set forth in claim 9 wherein said urging means includes means for establishing rotational equilibrium of said heater with respect to the point of contact between said heater and the extending laminate adjacent the curved edge.

11. The apparatus as set forth in claim 10 wherein said arm means comprises a pair of spaced apart arms and a bar interconnecting said arms and wherein said urging means extends from said bar.

12. The apparatus as set forth in claim 11 including retraction means for withdrawing said heater from contact with the extending laminate adjacent the curved edge.

13. The apparatus as set forth in claim 12 wherein said retraction means extends from said bar.

14. The apparatus as set forth in claim 12 wherein said means for establishing rotational equilibrium includes first urging means acting upon said torsion bar and second urging means for urging rotation of said heater in one direction about said torsion bar.

15. The apparatus as set forth in claim 14 wherein said first urging means urges rotation of said heater in one direction relative to the contact with the extending laminate and the adjacent curved edge and said second urging means urges rotation of said heater in the other direction relative to the contact with the extending laminate and the adjacent curved edge.

16. The apparatus as set forth in claim 1 wherein said arm means translates said heater up to 180° about the curved edge of the substrate.

17. A method for forming and adhering a laminate about a curved edge of a substrate, said method comprising the steps of:
a) supporting the substrate upon a framework and retaining it in place, which substrate includes a laminate extending from one surface past the curved edge of the substrate;
b) contacting the extending laminate with a heater, which heater is translatable about the curved edge to bend and form the extending laminate about the curved edge;
c) supporting the heater with a torsion bar to prevent bending and twisting of the heater during forming of the laminate extension;
d) translating with arm means the heater about the curved edge;
e) pivoting the arm means about a first pivot axis relative to the framework;
f) pivoting the heater about a second pivot axis relative to the torsion bar and wherein the second pivot axis is displaced from the first pivot axis; and
g) pivoting the torsion bar through an arc about a third pivot axis and relative to the arm means.

18. The method as set forth in claim 17 including the step of continuously urging the heater toward the curved edge during translation of the heater.

19. The method as set forth in claim 17 including the step of establishing rotational equilibrium of the heater with respect to the point of contact between the heater and the extending laminate adjacent the curved edge.

20. The method as set forth in claim 19 including the step of reducing the force required to pivot the arm means with counterweights.

21. The method as set forth in claim 17 including the step of heating the extending laminate at least commensurate with exercise of said step of translating.

22. The method as set forth in claim 17 including the step of urging the torsion bar toward the curved edge and the step of establishing rotational equilibrium of the heater with respect to the point of contact between the heater and the extending laminate adjacent the curved edge.

23. The method as set forth in claim 17 including the step of retracting the heater from the extending laminate adjacent the curved edge.

24. Apparatus for bending and forming a laminate extending from one surface of a substrate about a curved edge of the substrate, said apparatus comprising in combination:
a) means for securing the substrate to said apparatus with a laminate section extending past the curved edge;
b) means for contacting the laminate section;
c) means for rolling said contacting means around the curved edge to bend the laminate section against the curved edge, said rolling means including first pivot means for rotating said contacting means relative to the substrate, second pivot means for rotating said contacting means relative to the curved edge and third pivot means for translating said contacting means relative to the substrate;
d) means for supporting said contacting means to restrain bending and twisting of said contacting means; and
e) means for applying heat from said contacting means to the laminate section during at least bending of the laminate section.

25. The apparatus as set forth in claim 24 including means for establishing rotational equilibrium of said contacting means with respect to the point of contact between said contacting means and the extending laminate section adjacent the curved edge.

26. The apparatus as set forth in claim 24 including means for urging said contacting means against the extending laminate section adjacent the curved edge.

27. The apparatus as set forth in claim 26 wherein said urging means comprises first urging means for rotating said contacting means in one direction relative to the line of contact between said contacting means and the curved edge and second urging means for rotating said contacting means in the other direction relative to the line of contact between said contacting means and the curved edge.

28. The apparatus as set forth in claim 24 including means for manually actuating said translating means.

* * * * *